(12) United States Patent
Aronowitz et al.

(10) Patent No.: US 8,249,872 B2
(45) Date of Patent: Aug. 21, 2012

(54) SKIPPING RADIO/TELEVISION PROGRAM SEGMENTS

(75) Inventors: Hagai Aronowitz, Petah-Tikva (IL); Itzhack Goldberg, Hadera (IL); Ron Hoory, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 12/193,182

(22) Filed: Aug. 18, 2008

(65) Prior Publication Data

US 2010/0042412 A1     Feb. 18, 2010

(51) Int. Cl.
    *G10L 15/00*     (2006.01)
(52) U.S. Cl. .............. 704/246; 704/251; 455/166.1
(58) Field of Classification Search ............ 704/246, 704/251; 455/166.1
    See application file for complete search history.

(56) References Cited

U.S. PATENT DOCUMENTS

| 6,756,997 | B1 * | 6/2004 | Ward et al. ............ 715/716 |
| 2002/0110226 | A1 | 8/2002 | Kovales et al. |
| 2002/0147782 | A1 | 10/2002 | Dimitrova et al. |
| 2003/0033603 | A1 * | 2/2003 | Mori et al. ............ 725/46 |
| 2005/0020223 | A1 | 1/2005 | Ellis et al. |
| 2005/0281537 | A1 * | 12/2005 | Kim ............ 386/83 |
| 2006/0258308 | A1 | 11/2006 | Fassbender |
| 2007/0071206 | A1 | 3/2007 | Gainsboro et al. |
| 2007/0188901 | A1 | 8/2007 | Heckerman et al. |
| 2008/0134249 | A1 * | 6/2008 | Yang et al. ............ 725/46 |
| 2009/0023406 | A1 * | 1/2009 | Ellis et al. ............ 455/140 |
| 2009/0123025 | A1 * | 5/2009 | Deng et al. ............ 382/100 |

OTHER PUBLICATIONS

C. Barras et al., "Improving Speaker Diarization," in Proc. DARPA RT04, 2004, 5 pages.
D. A. Reynolds et al., "The MIT Lincoln Laboratory RT-04F Diarization Systems: Applications to Broadcast News and Telephone Conversations," in Proc. DARPA RT04, NIST Rich Transcription Workshop, Nov. 2004, 10 pages.
A. Rosenberg et al., "Story Segmentation of Broadcast News in English, Mandarin and Arabic", in Proc. HLT, 2006, http://www1.cs.columbia.edu/~amaxwell/pubs/storyseg-final-hlt.pdf, 4 pages.
S. Tranter et al., "An Overview of Automatic Speaker Diarisation Systems," IEEE Trnas. On SAP, 2006, pp. 1-8, vol. 7.

* cited by examiner

*Primary Examiner* — Daniel D Abebe
(74) *Attorney, Agent, or Firm* — Suzanne Erez; Ryan, Mason & Lewis, LLP

(57) ABSTRACT

Techniques for notifying at least one entity of an occurrence of an event in an audio signal are provided. At least one preference is obtained from the at least one entity. An occurrence of an event in the audio signal is determined. The event is related to at least one of at least one speaker and at least one topic. The at least one entity is notified of the occurrence of the event in the audio signal, in accordance with the at least one preference.

14 Claims, 4 Drawing Sheets

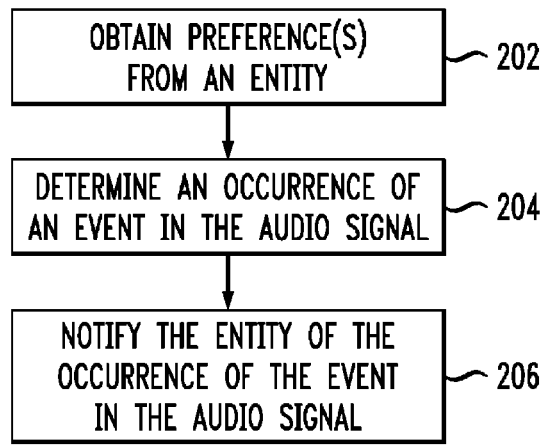
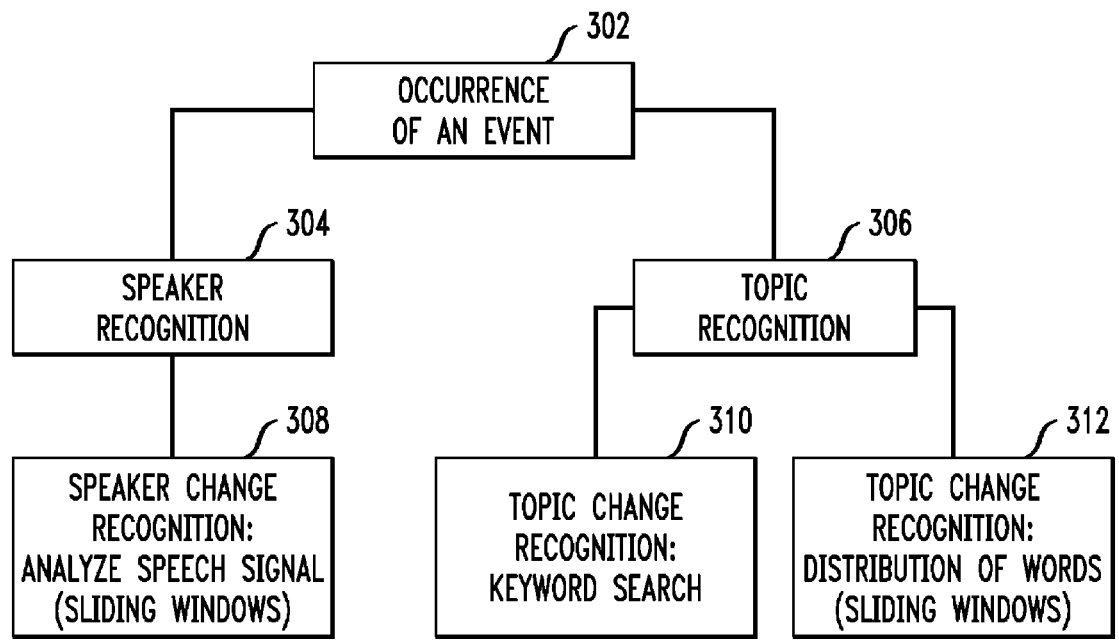

SKIPPING RADIO/TELEVISION PROGRAM SEGMENTS

FIELD OF THE INVENTION

The present invention relates generally to audio signals and, more particularly, to techniques for notifying an entity of an occurrence of an event in an audio signal.

BACKGROUND OF THE INVENTION

Due to the tremendous number of viewing and listening options available to audiences today, audiences have become accustomed to channel surfing. One form of channel surfing is when a television viewer or radio listener switches between multiple television channels or radio frequencies, numerous times, over one viewing or listening period. Audiences may channel surf for a number of reasons. For example, at a given moment, a viewer/listener may not like a particular person on a program segment or the viewer/listener may not like a particular subject being discussed. Another common reason to switch television channels or radio frequencies is to skip unwanted segments, such as advertisements (i.e., commercials). Regardless of an audience member's reasons for switching away from a channel or frequency, the audience member may still have an interest in returning to the channel or frequency after the reasons for switching has passed. This behavior is consistent with an interest to skip unwanted program segments.

Conventional techniques attempt to assist audiences with skipping unwanted segments. One primitive tool is the picture-in-picture option of modern televisions. This allows an audience to monitor, simultaneously, multiple television channels at one time. By monitoring multiple channels, an audience member may switch back and forth between multiple channels in accordance with visual cues. For instance, if the commercial break for a viewer's favorite show has ended, the viewer may switch channels to view his/her favorite show. In practice, however, the picture-in-picture option is distracting because the viewer must constantly monitor and visually determine when to switch channels. Further, picture-in-picture does not work for audio-based programming (e.g., radio transmissions).

Other proposed solutions for assisting audiences in skipping unwanted program segments involve embedding digital signals into the television and/or radio broadcast. For example, the digital signals may be used to denote the start, end, and duration of a broadcasted program. Further, some embedded signals mark the beginning and end of commercial segments, which gives an audience member the ability to skip advertisements. However, embedded digital signals suffer practical disadvantages. First, they require modification of the originally broadcasted signal. Second, an additional device is required at the receiving end of the broadcast to interpret the embedded digital signals. Finally, the audience cannot skip program segments with a more precise level of granularity, beyond the digitally pre-marked segments. In other words, the audience cannot flexibly pinpoint when a segment of interest begins and ends without constantly switching back and forth between multiple television channels and/or radio frequencies.

SUMMARY OF THE INVENTION

Principles of the present invention provide techniques that overcome the above-mentioned drawbacks associated with existing methods by providing techniques that address the above needs, as well as other needs. Particularly, principles of the invention utilize speaker and topic recognition to notify an entity (e.g., a viewing and/or listening audience member) of specific events in an audio signal.

For example, in one embodiment of the invention, a technique for notifying at least one entity of an occurrence of an event in an audio signal is provided. At least one preference is obtained from the at least one entity. An occurrence of an event in the audio signal is determined. The event is related to at least one of at least one speaker and at least one topic. The at least one entity is notified of the occurrence of the event in the audio signal, in accordance with the at least one preference.

In additional embodiments, the above technique for notifying at least one entity of an occurrence of an event in an audio signal may be carried out by an apparatus, system, and/or a computer program product.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 2 is a flow diagram illustrating a methodology for notifying at least one entity of an occurrence of an event in an audio signal, according to an embodiment of the present invention.

FIG. 3 is a diagram illustrating the ways to determine an occurrence of an event, according to an embodiment of the present invention.

DETAILED DESCRIPTION OF PREFERRED EMBODIMENTS

The present invention will be described in conjunction with exemplary methods for notifying at least one entity of an occurrence of an event in an audio signal. The present disclosure will be explained in the context of skipping radio and/or television segments in accordance with the preferences of a listening and/or viewing audience; however, it is to be appreciated that the proposed techniques are not limited to the particular embodiments described herein. For instance, the principles of this invention may be applied to any audio signal, not only audio signals of radio and television broadcasts. Further, the present invention is not limited to real-time broadcasts, but may also be used in conjunction with recorded material. Modifications to the illustrative embodiments will become apparent to those skilled in the art given the teachings described herein.

The term "entity" as used herein is intended to be construed broadly so as to encompass, by way of example and without limitation, any person or thing. In the present disclosure, an entity may include a viewing or listening audience, or audience member.

The term "audio signal" as used herein is intended to be construed broadly so as to encompass, by way of example and without limitation, any analog or digital signal related to sound. For example, the audio signal may be from a television transmission and/or a radio transmission.

The present techniques provide an entity the ability to skip segments of a television and/or radio transmission. Unlike conventional techniques where program segments are pre-defined by digital markers, the present invention identifies program segments via speaker diarization, speech recognition, and/or topic recognition and segmentation. The beginning of each segment may signify a distinct event, for instance, a change in speaker or a change in topic. In accordance with an entity's preferences for notification, the invention notifies the entity of an occurrence of a specific event.

In one illustrative embodiment, a television viewer may switch channels because a currently viewed news broadcast is discussing the topic of politics, a topic that is of little interest to the viewer. At the same time, the television viewer may want to return to the news broadcast when the topic of sports is discussed. While viewing a different channel, the viewer may be cued to return to the news broadcast when the topic of sports is raised. Therefore, the present invention may monitor the content of various channels as if an individual were monitoring each and every channel. When the content of one or more channels is consistent with the preferences of the viewer, the viewer is notified. In essence, the core idea of the present invention is to mimic and automate the way in which humans analyze audio content.

Figure 1:
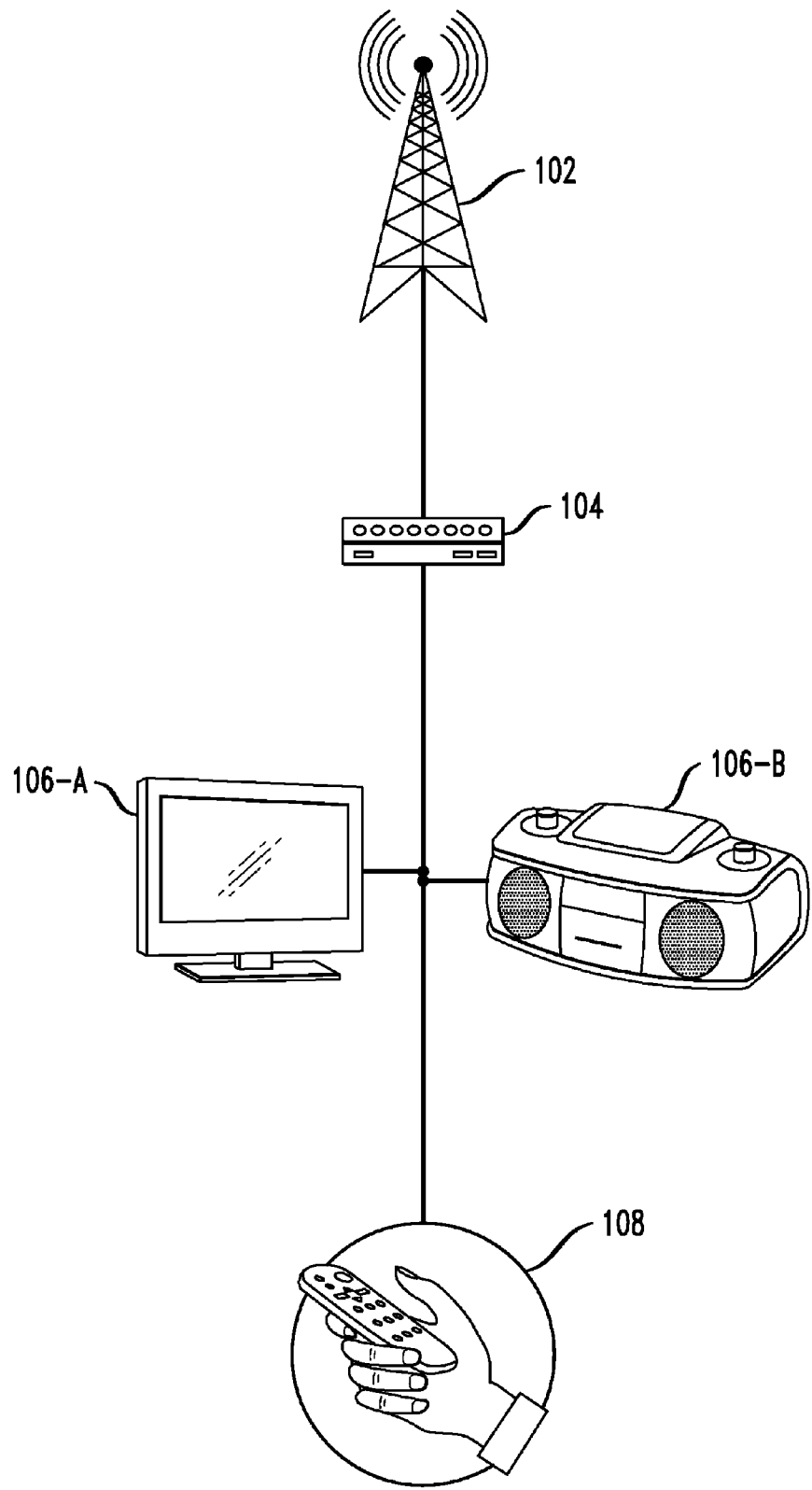
FIG. 1 is a diagram illustrating one general implementation for employing the proposed techniques, according to an embodiment of the present invention.

Referring initially to FIG. 1, a diagram illustrates one general implementation for employing the proposed techniques, according to an embodiment of the present invention. In an exemplary embodiment, an audio signal 102 in the form of a television or radio transmission is broadcast via cable, satellite, antennae, etc. The audio signal 102 is received and processed by a processor 104 which may be a component of a television 106-A, a radio 106-B, or other computer-based device. Processor 104 may also be a separate device or part of a separate system, for example, a set-top box provided by a cable or satellite provider may incorporate processor 104 into its circuit architecture.

Processor 104 may be configured to identify speakers and/or topics within an audio signal 102. This allows the processor 104 to determine notable segments within the audio signal 102. For example, the processor 104 may identify points in the audio signal 102 where certain events occur, such as, when speakers change, topics change, interviews begin or end, and commercials begin or end. Processor 104 then notifies an entity 108 (i.e., viewer/listener) of an event according to the preferences of the entity. In an exemplary embodiment, a notification to the entity 108 may include, but is not limited to, a cue that an undesirable interview has ended, an undesirable speaker is no longer speaking, a preferred speaker is beginning to speak, a preferred program has resumed (e.g., a commercial break has ended), an undesirable topic is no longer being discussed, and a preferred topic is being raised. In the alternative, the notification may be an automatic change to a channel or frequency that matches the entity's 108 preferences.

The processor 104 may obtain notification preferences from an entity 108 via a preference user interface (not shown). The preference user interface may comprise a programmable menu wherein the entity can specify a speaker of interest (e.g., I want to hear speaker X speak), a speaker of disinterest (e.g., I do not want to hear speaker Y speak), a topic of interest (e.g., I want to hear the weather), a topic of disinterest (e.g., I do not want to hear about politics), a program of interest (e.g., I want to watch program Z), a program of disinterest (e.g., I do not want to see commercials or any other advertisements), a period of time (e.g., I am interested in any content between 8 PM and 9 PM), and/or any combination of the above (e.g., I want to be notified when speaker P is speaking on program Q between the times of 7:30 PM and 8:00 PM). The way in which processor 104 processes audio signal 102 will be described in greater below with reference to FIGS. 2-4.

Referring now to FIG. 2, a flow diagram illustrates a methodology 200 for notifying at least one entity of an occurrence of an event in an audio signal, according to an embodiment of the present invention. In an exemplary embodiment, methodology 200 is carried out by processor 104 of FIG. 1. At step 202, preferences are obtained from an entity. At step 204, an occurrence of an event is determined in an audio signal (e.g., signal 102 of FIG. 1). If the event is relevant to the preferences of the entity, the entity is notified of the event (step 206).

An event in an audio signal may be speaker related. In an illustrative embodiment, one event may be a specific speaker speaking, for example, processor 104 may determine that speaker X is currently speaking on channel 5. Another event may be a specific speaker beginning to speak, for instance, speaker X may have just started speaking on channel 5. Another event may be a specific speaker no longer speaking, for example, speaker X may have stopped speaking on channel 5, which gives the entity a reason to revisit channel 5.

In the alternative, the event in the audio signal may be topic related. In an illustrative embodiment, the event may be the existence of a specific topic, for instance, the topic of weather is being discussed on channel 11. Further, the event may be the initiation of a specific topic, for example, the topic of sports has just been raised on channel 11. Another event may be the termination of a specific topic, for instance, the undesirable topic of politics is no longer being discussed on channel 11; therefore, the entity may want to consider revisiting channel 11.

Referring now to FIG. 3, a diagram illustrates the ways to determine an occurrence of an event, according to an embodiment of the present invention. FIG. 3 illustrates the details of step 204 of FIG. 2. In an exemplary embodiment, an occurrence of an event 302 may be determined in two basic ways: (1) by identifying speakers within the audio signal (e.g., speaker recognition 304); and/or (2) by identifying topics within the audio signal (e.g., topic recognition 306).

The techniques for identifying speakers within an audio signal (e.g., speaker diarization) are known to a person having ordinary skill in the art. See Sue Tranter, "An Overview of Automatic Speaker Diarisation Systems," IEEE Transactions on Speech and Audio Processing, Special Issue on Rich Transcription, Vol 14, Number 5, pp. 1557-1565, September 2006; C. Barras et al., "Improving Speaker Diarization," in Proc. DARPA RT04, 2004; D. A. Reynolds et al., "The MIT Lincoln Laboratory RT-04F Diarization Systems: Applications to Broadcast News and Telephone Conversations," in Proc. DARPA RT04, 2004, the disclosures of which are incorporated by reference herein. Speaker diarization is the process of segmenting an audio signal/stream into speaker homogeneous segments, and associating segments which share the same speaker identity.

In one illustrative embodiment, training models are used to detect and isolate regions of speech within an audio signal. Training models allow a diarization system to distinguish between regions of speech and regions of non-speech (e.g., silence and background noise). Speakers are then identified within the isolated regions of speech (e.g., speech signal). One method of identifying speakers is to correlate the regions of speech to a database of known speakers. For example, a region of speech may coincide with the voice of a known television or radio personality. In alternative embodiments, the identity of a speaker may be obtained through a closed caption transmission traveling together with the audio signal. Or, the entity may supply the identity of the speaker via the preference user interface. It should be noted, however, that speaker diarization may be carried out without any prior knowledge about the speakers. In this case, the regions of speech are labeled, "speaker 1," "speaker 2," etc.

Speaker recognition 304 is a basic form of determining a distinct event within an audio signal (e.g., the existence of one or more speakers at a particular moment in an audio signal). Basic speaker recognition may be useful when an entity has an interest in locating a speaker of interest. For example, when an entity first turns on a television or radio, the entity may want to locate any programs featuring speaker X.

A more advanced derivative of speaker recognition 304 is speaker change recognition 308, which involves identifying points in an audio signal where there has been a change in speaker. In an exemplary embodiment, speaker change recognition may be carried out by analyzing regions of speech using a system of sliding windows. In one embodiment, a speech signal is generated from the audio signal. This involves isolating regions of speech from regions of non-speech and combining the regions of speech together to create a continuous speech signal. A change in speaker is then detected by scanning the speech signal with a plurality of adjacent sliding windows.

In an illustrative embodiment, a pair of adjacent sliding windows, window 1 and window 2, scan the speech signal. Window 1 and window 2 may be directly connected to each other at a point denoted time t. The adjacent windows move across the speech signal and each window analyzes the acoustic vectors of the speech within its boundaries. The average values of the acoustic vectors within each window are calculated. These values are then used to identify the speaker or speakers within each window. The boundaries of a window may be defined by a time frame f. In an exemplary embodiment, time frame f may be a time period in seconds. For example, window 1 may detect a speaker within a five second interval before time t of the speech signal, while window 2 may detect a speaker in a five second interval after time t of the speech signal.

It is to be appreciated that when time frame f is large, there is greater accuracy in speaker recognition because a larger window encompasses more speech data. However, a larger time frame f requires more acoustic calculations; therefore, more processing power and more processing time is required. In the alternative, when time frame f is small, speaker recognition within a window is less accurate; however, less processing power and time is required. Time frame f may be set by an entity and/or automatically set by the speaker recognition system. In one example, if the quality of an audio signal is poor, time frame f is automatically increased because a larger time frame covers more speech data for more accurate speaker recognition.

When the identified speaker of one window differs from the identified speaker of an adjacent window, time t (e.g., the point where two adjacent windows meet) marks the point in the speech signal where there has been a change in speaker. In an exemplary embodiment, a change in speaker may trigger a notification to the entity depending on the preferences of the entity. For example, if an entity specifies an interest in hearing speaker X speak and the system detects a change in speaker from speaker Y to speaker X on program P, the entity is notified of the occurrence. At this point, the entity may consider switching to program P. In the alternative, the system may conveniently switch to program P automatically.

In addition to speaker recognition 304 and speaker change recognition 308, topic recognition 306 (e.g., topic segmentation) is another way to determine a distinct event within an audio signal. The basic techniques for topic recognition are generally known to a person having ordinary skill in the art. In an illustrative embodiment, the first step of topic recognition is to transcribe the speech of an audio signal into words. After the speech is transcribed, a topic may be identified by analyzing a transcribed word at a particular point in time within the audio signal. For example, the word "basketball" may indicate that the topic of sports is being discussed, or the word "president" may indicate that the topic of politics is being discussed. A derivative of topic recognition 306 is topic change recognition, or identifying a change in topic. Topic change recognition may be carried out in two ways: (1) searching for keywords (310); and/or (2) analyzing the distribution of words (312).

Topic change recognition via keyword search 310 is a basic method of identifying changes in topic. In a keyword search, the transcribed words of an audio signal are analyzed in succession and changes in keywords are detected. In an exemplary embodiment, a collection of keywords organized by topic are stored in a database. When a keyword related to a specific topic appears, the topic recognition system assumes that specific topic is being discussed. As keywords related to one topic shift to keywords related to a different topic, there is an assumption that there has been a change in topic. For instance, words such as "sports," "basketball," "baseball," "soccer," "football," "score," are keywords which may indicate the topic of sports. In the alternative, words such as "weather," "temperature," "forecast," "sunny," "cloudy," "rain," "rainy," "humid," "foggy," are keywords which may indicate the topic of weather. The following transcribed speech illustrates a topic change from sports to weather: "In baseball news, the Mets beat the Red Sox by a score of 3 to 1. Now let's go to John for the weather. What is the weather John? It will be sunny this afternoon with a chance of rain later in the evening."

A more advanced technique of topic change recognition is to analyze the distribution of words before and after a point in time (e.g., time t) within the audio signal. This technique is similar to the adjacent sliding windows used in speaker change recognition 308 described above, wherein time t denotes a topic change within an audio signal. In an exemplary embodiment, a pair of adjacent sliding windows scans a stream of words transcribed from an audio signal. Each window identifies the topic or topics expressed within its boundaries, denoted by time frame f. For example, when time frame f is five seconds, words that appear five seconds before time t are analyzed by one window and words that appear five seconds after time t are analyzed by an adjacent window. A difference in topic or topics from one window to another may indicate that a change in topic has occurred.

It should be noted that a larger time frame f (e.g., ten seconds, fifteen seconds, etc.) will result in greater topic recognition accuracy because a larger time frame will encompass more words for topic recognition. In contrast, a smaller time frame f (e.g., three seconds, etc.) will result in reduced topic recognition accuracy because there may be fewer words for topic recognition. Furthermore, as with speaker change recognition 308, a larger time frame f may require more processing power and more processing time; however, a larger time frame f may be necessary if the quality of an audio signal is poor. For instance, if a signal is poor and the transcribed words are unreadable, a large time frame encompassing more words may be needed for topic recognition. Time frame f may be adjusted by an entity or automatically by the topic recognition system.

In an exemplary embodiment, a scoring system is used to carry out topic recognition; the words within the boundaries of a window are scored according to topic. Scoring may be carried out by applying one or more statistical language models. Statistical language models are used to quickly identify the topics being expressed in a set of words. In one embodiment, a statistical language model comprises a list of broad topics (e.g., sports, health, politics, etc.). Each broad topic comprises a language model or keywords related to the broad topic (e.g., the terms "basketball" and "football" fall within the topic of sports). If a set of words correlate strongly to a specific topic, the words are assigned a high score for that topic. In the alternative, a low score is assigned if a set of words show a weak correlation to a given topic. A decrease in score from one window to an adjacent window may indicate a change in topic.

A probability calculation may also be used concurrently with the scoring system described above. In one example, a slight decrease in one score with regard to one topic and a slight increase in another score with regard to another topic may not indicate a topic change from one topic to another topic. In order to accurately determine a change in topic, the probability calculation takes into account the amount of change in scores from one window to an adjacent window. For instance, a dramatic decrease in the score related to the topic of sports and a dramatic increase in the score related to the topic of weather, most likely indicates a topic change from sports to weather. The probability calculation may also take into account a change in speaker (e.g., speaker change recognition 308). For example, changes in topic scores accompanied by a change in speaker may strongly indicate that a topic change has occurred.

In an illustrative embodiment, a calculated probability of a topic change may be analyzed in accordance with a predefined threshold value. For example, if the calculated probability of a topic change is 95% and the threshold value is 90%, the system may assume that a change in topic has occurred. In the alternative, if the calculated probability is 85% and the threshold value is 90%, the system will not assume that a change in topic has occurred. It should be noted that the threshold value may be manually set by an entity. Further, the threshold value may be automatically adjusted, for example, if the quality of an audio signal is poor, the threshold value may be set to a low number (e.g., 60%) because a topic change may not be as obvious due to poor transcribing and topic recognition.

Figure 4:
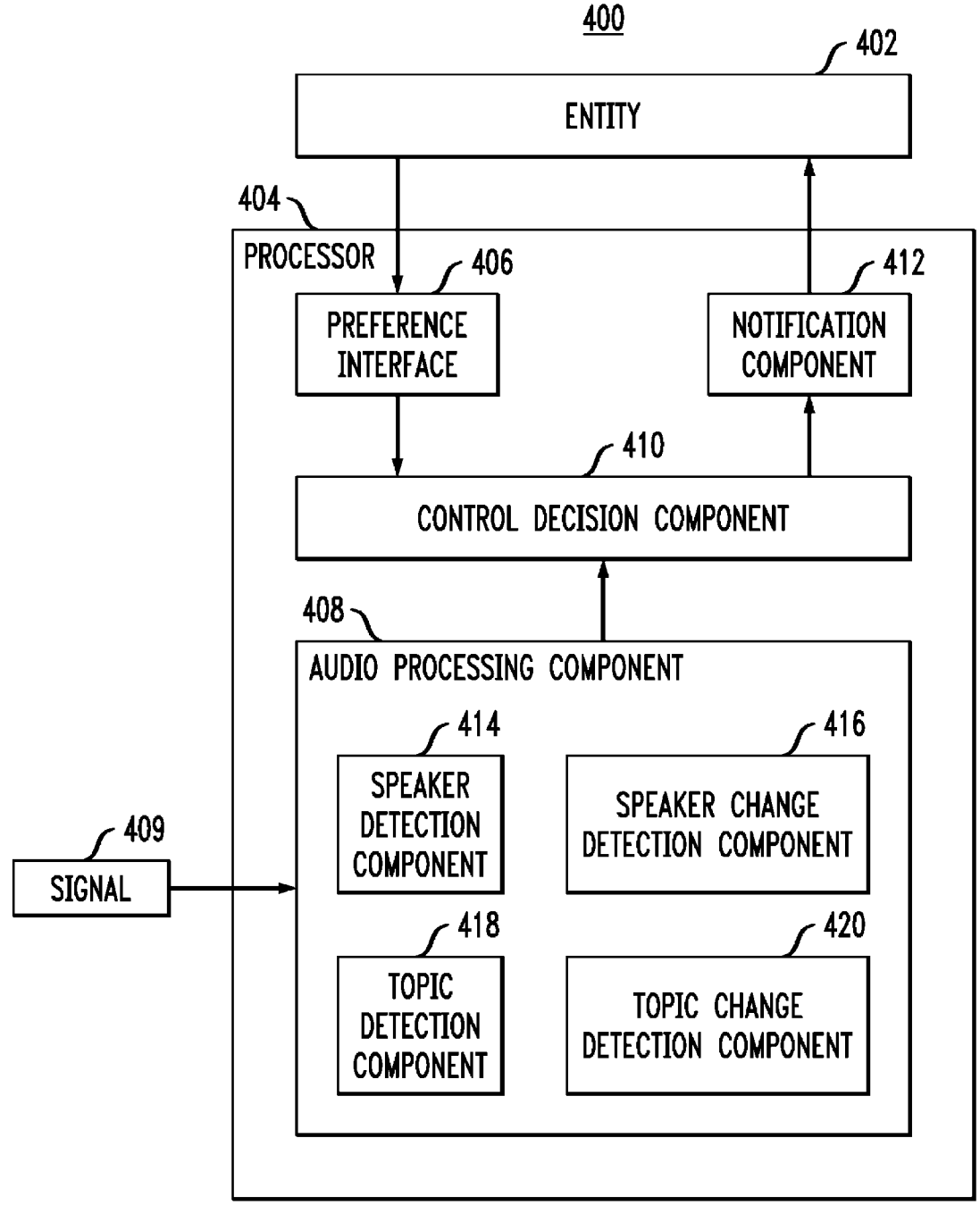
FIG. 4 is a system diagram illustrating the components which may be used to carry out the methodology of FIG. 2, according to an embodiment of the present invention.

Referring now to FIG. 4, a system diagram illustrates the components which may be used to carry out the methodology of FIG. 2, according to an embodiment of the present invention. System 400 comprises an entity 402 (e.g., a viewer/listener) a processor 404, and a signal 409 (e.g., a transmission comprising an audio signal). Processor 404 may comprise a preference interface 406, an audio processing component 408, a control decision component 410, and a notification component 412. The audio processing component 408 may comprise a speaker detection component 414, a speaker change detection component 416, a topic detection component 418, and a topic change detection component 420.

In an illustrative embodiment, entity 402 interacts with the processor 404 via the preference interface 406. The entity 402 may specify notification preferences, such as, a speaker of interest, a speaker of disinterest, a topic of interest, a topic of disinterest, a program of interest, a program of disinterest, a period of time for notification, or any combination thereof. The preferences define the parameters for notifying the entity 402 of an occurrence of an event. Next, the control decision component 410 obtains and stores the preferences of the entity 402.

The control decision component 410 processes data from the audio processing component 408 in accordance with the stored preferences. The data from the audio processing component 408 may comprise speaker and/or topic data derived from signal 409. Signal 409 is processed as described above with reference to FIG. 3.

The speaker detection component 414 carries out speaker recognition as previously described with reference to FIG. 3, block 304. The speaker change detection component 416 carries out speaker change recognition as described with reference to FIG. 3, block 308. The topic detection component 418 carries out topic recognition as described above with reference to FIG. 3, block 306. Further, the topic change detection component 420 carries out topic change recognition via keyword search and/or word distribution analysis as described with reference to FIG. 3, blocks 310 and 312.

In accordance with the preferences obtained from the preference interface 406, the control decision component 410 determines if an event in the signal 409 should be reported to the entity 402. For instance, if an entity 402 wants to be notified when speaker X discusses the topic of health during program Y between the times of 7 PM and 8PM, the control decision component 410 monitors signal 409 until those conditions occur. If the conditions occur, the control decision component 410 sends an instruction to the notification component 412 to notify the entity 402 that an event of interest has occurred. In one illustrative embodiment, the entity 402 may be prompted to switch to program Y because speaker X is discussing health. In the alternative, notification component 412 may automatically switch to program Y.

Figure 5:
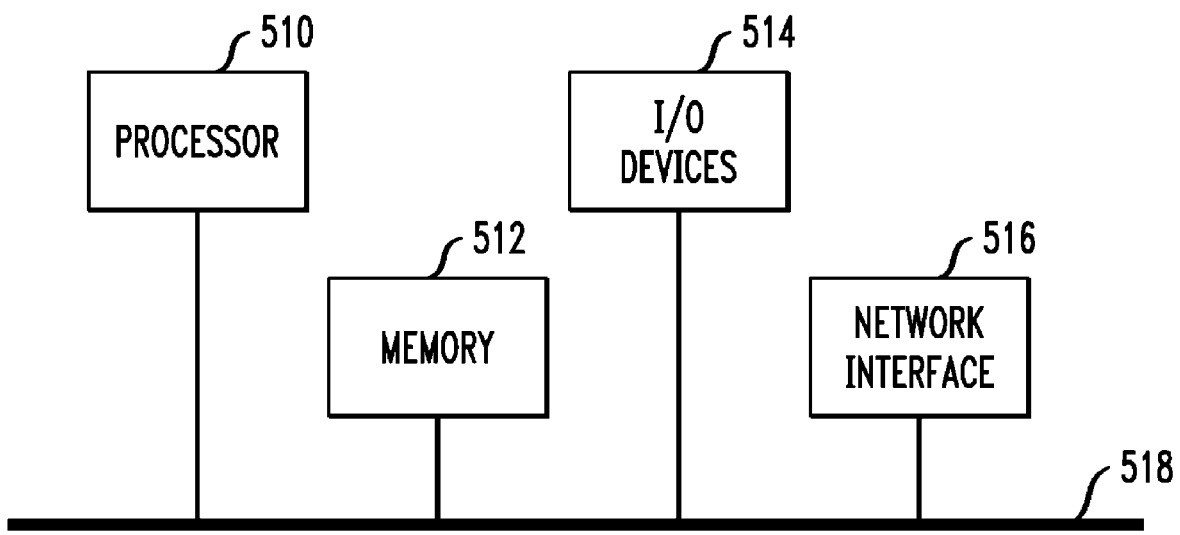
FIG. 5 is a diagram illustrating an illustrative hardware implementation of a computing system in accordance with which one or more components/methodologies of the present invention may be implemented, according to an embodiment of the present invention.

Referring now to FIG. 5, block diagram 500 illustrates an exemplary hardware implementation of a computing system in accordance with which one or more components/methodologies of the invention (e.g., components/methodologies described in the topic of FIGS. 1-4) may be implemented, according to an embodiment of the present invention.

As shown, the techniques for notifying at least one entity of an occurrence of an event in an audio signal may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Further, the present invention was described above with reference to diagrams of methods, apparatus (systems), and computer program products according to embodiments of the invention. It will be understood that individual functions/acts in the diagrams, and combinations of functions/acts in the diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the diagrams.

These computer program instructions may also be stored in a computer-readable medium that may direct a computer or other programmable data processing apparatus to function in a particular manner, such that the instructions stored in the computer-readable medium produce an article of manufacture including instruction means which implement the functions/acts specified in the diagrams.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the diagrams.

The diagrams illustrate the architecture, functionality, and operation of possible implementations of systems, methods, and computer program products according to various embodiments of the present invention. In this regard, individual functions/acts in the diagrams may represent a module, segment, or portion of code, which comprises one or more executable instructions for implementing the specified logical function(s). It should also be noted that, in some alternative implementations, the functions/acts in the diagrams may occur out of the order noted in the diagrams. For example, two steps shown in succession may, in fact, be executed substantially concurrently, or the steps may sometimes be executed in the reverse order, depending upon the functionality involved. It will also be noted that individual functions/acts in the diagrams, and combinations of functions/acts in the diagrams, may be implemented by special purpose hardware-based systems that perform the specified functions or acts, or combinations of special purpose hardware and computer instructions.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for notifying at least one entity of an occurrence of an event in an audio signal, the method comprising:
    obtaining at least one preference from the at least one entity;
    processing the audio signal to determine an occurrence of an event therein based on the audio signal, wherein the event is related to at least one of at least one speaker and at least one topic; and
    notifying the at least one entity of the occurrence of the event in the audio signal, in accordance with the at least one preference;
    wherein the step of processing the audio signal to determine an occurrence of an event therein based on the audio signal further comprises the step of detecting a change in the at least one speaker by:
    generating a speech signal by removing at least one region of non-speech from the audio signal; and
    detecting a change in the at least one speaker by analyzing the speech signal with a plurality of adjacent sliding windows, each of the plurality of adjacent sliding windows applying at least one model of acoustic vectors, wherein the plurality of adjacent sliding windows are used to compare the at least one speaker of the speech signal within a time frame f, before and after a time t.

2. A method for notifying at least one entity of an occurrence of an event in an audio signal, the method comprising;
    obtaining at least one preference from the at least one entity;

processing the audio signal to determine an occurrence of an event therein based on the audio signal, wherein the event is related to at least one of at least one speaker and at least one topic; and notifying the at least one entity of the occurrence of the event in the audio signal, in accordance with the at least one preference;

wherein the step of processing the audio signal to determine an occurrence of an event therein based on the audio signal further comprises the step of detecting a change in the at least one topic by:

transcribing the audio signal into text data; and detecting a change in the at least one topic by analyzing, in succession, one or more words in the text data, wherein the one or more words relate to the at least one topic.

3. The method of claim 2, wherein the step of detecting a change in the at least one topic further comprises the step of generating a probability that a change in the at least one topic has occurred by analyzing the text data with a plurality of adjacent sliding windows, wherein the plurality of adjacent sliding windows are used to compare, in accordance with a statistical language model, the one or more words within a time frame f, before and after a time t.

4. The method of claim 3, wherein the probability is in accordance with a change in the at least one speaker.

5. An apparatus for notifying at least one entity of an occurrence of an event in an audio signal, the apparatus comprising:

a memory; and at least one processor coupled to the memory and operative to: obtain at least one preference from the at least one entity; process the audio signal to determine an occurrence of an event therein based on the audio signal, wherein the event is related to at least one of at least one speaker and at least one topic; and notify the at least one entity of the occurrence of the event in the audio signal, in accordance with the at least one preference;

wherein in the operation of processing the audio signal to determine an occurrence of an event therein based on the audio signal, the at least one processor is further operative to detect a change in the at least one speaker, the at least one processor being operative to: generate a speech signal by removing at least one region of non-speech from the audio signal; and detect a change in the at least one speaker by analyzing the speech signal with a plurality of adjacent sliding windows, each of the plurality of adjacent sliding windows applying at least one model of acoustic vectors, wherein the plurality of adjacent sliding windows are used to compare the at least one speaker of the speech signal within a time frame f, before and after a time t.

6. An apparatus for notifying at least one entity of an occurrence of an event in an audio signal, the apparatus comprising:

a memory; and at least one processor coupled to the memory and operative to: obtain at least one preference from the at least one entity; process the audio signal to determine an occurrence of an event therein based on the audio signal, wherein the event is related to at least one of at least one speaker and at least one topic; and notify the at least one entity of the occurrence of the event in the audio signal, in accordance with the at least one preference;

wherein in the operation of processing the audio signal to determine an occurrence of an event therein based on the audio signal, the at least one processor is further operative to detect a change in the at least one topic, the at least one processor being operative to: transcribe the audio signal into text data; and detect a change in the at least one topic by analyzing, in succession, one or more words in the text data, wherein the one or more words relate to the at least one topic.

7. The apparatus of claim 6, wherein the operation of detecting a change in the at least one topic, the at least one processor is further operative to generate a probability that a change in the at least one topic has occurred by analyzing the text data with a plurality of adjacent sliding windows, wherein the plurality of adjacent sliding windows are used to compare, in accordance with a statistical language model, the one or more words within a time frame f, before and after a time t.

8. A system for notifying at least one entity of an occurrence of an event in an audio signal, the system comprising:

a preference interface for obtaining at least one preference from the at least one entity;

an audio processor for processing the audio signal to determine an occurrence of an event therein based on the audio signal, wherein the event is related to at least one of at least one speaker and at least one topic; and a notification component for notifying the at least one entity of the occurrence of the event in the audio signal, in accordance with the at least one preference;

wherein the audio processing component comprises a speaker change detection component configured to detect a change in the at least one speaker by: generating a speech signal by removing at least one region of non-speech from the audio signal; and detecting a change in the at least one speaker by analyzing the speech signal with a plurality of adjacent sliding windows, each of the plurality of adjacent sliding windows applying at least one model of acoustic vectors, wherein the plurality of adjacent sliding windows are used to compare the at least one speaker of the speech signal within a time frame f, before and after a time t.

9. A system for notifying at least one entity of an occurrence of an event in an audio signal, the system comprising:

a preference interface for obtaining at least one preference from the at least one entity;

an audio processor for processing the audio signal to determine an occurrence of an event therein based on the audio signal, wherein the event is related to at least one of at least one speaker and at least one topic; and a notification component for notifying the at least one entity of the occurrence of the event in the audio signal, in accordance with the at least one preference;

wherein the audio processing component comprises a topic change detection component configured to detect a change in the at least one topic by: transcribing the audio signal into text data;

and detecting a change in the at least one topic by analyzing, in succession, one or more words in the text data, wherein the one or more words relate to the at least one topic.

10. The system of claim 9, wherein the topic change detection component is further configured to generate a probability that a change in the at least one topic has occurred by analyzing the text data with a plurality of adjacent sliding windows, wherein the plurality of adjacent sliding windows are used to compare, in accordance with a statistical language model, the one or more words within a time frame f, before and after a time t.

11. A method for notifying at least one entity of an occurrence of an event in an audio signal, the method comprising:
obtaining at least one preference from the at least one entity;
processing the audio signal to determine an occurrence of an event therein based on the audio signal, wherein the event is related to at least one of at least one speaker and at least one topic; and
notifying the at least one entity of the occurrence of the event in the audio signal, in accordance with the at least one preference;
wherein the step of processing the audio signal to determine an occurrence of an event therein based on the audio signal further comprises the step of detecting a change in the at least one speaker by:
generating a speech signal from the audio signal; and
detecting a change in the at least one speaker by analyzing the speech signal.

12. The method of claim 11, wherein generating a speech signal from the audio signal comprises removing at least one region of non-speech from the audio signal.

13. The method of claim 11, wherein analyzing the speech signal comprises analyzing the speech signal with a plurality of adjacent sliding windows.

14. The method of claim 13, wherein each of the plurality of adjacent sliding windows applies at least one model of acoustic vectors.

* * * * *